Figure 1:
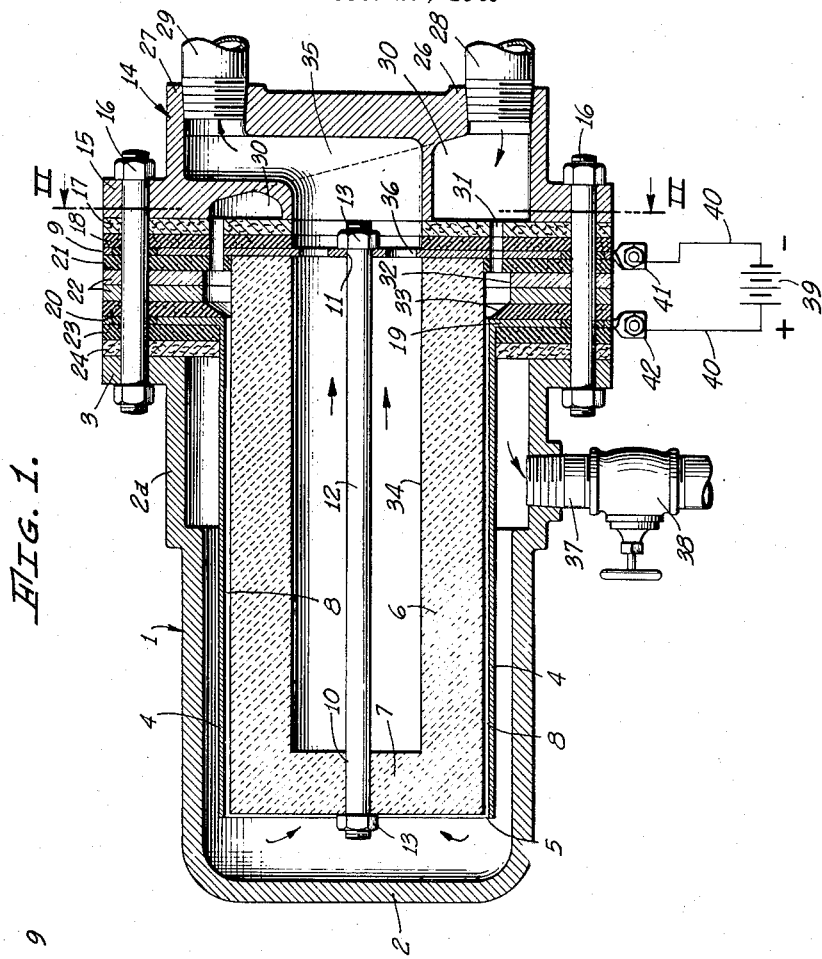

Nov. 23, 1943.  J. T. ROFFY  2,334,790
FILTER
Filed Oct. 29, 1940

JOSEPH T. ROFFY,
INVENTOR:

BY Harold A. Mattingly
ATTORNEY

Patented Nov. 23, 1943

2,334,790

UNITED STATES PATENT OFFICE 2,334,790

FILTER

Joseph T. Roffy, Los Angeles, Calif., assignor of one-third to Abraham Rothenberg, Los Angeles, Calif.

Application October 29, 1940, Serial No. 363,244

3 Claims. (Cl. 204—264)

My invention relates to a filter and has particular reference to a liquid filter which is so constructed as to permit substantially uninterrupted operation for long periods of time without requiring either cleaning or the renewal of the filter element.

Prior to my invention some filters intended for the purpose of filtering solid matter and particles out of liquids comprised a chamber within which was mounted a porous filter element in such manner that liquid supplied to the chamber was forced to pass through the filter element in order to escape from the chamber. These filters required either frequent cleaning of the chamber on the filter element or, in the case of certain types of filter elements, required the removal of the clogged filter element and the substitution therefor of an entirely new element.

Depending, of course, upon the amount of solid matter to be filtered out of the liquid, this cleaning or renewing operation had to be performed more or less frequently. In case the cleaning or renewal of the filter was not undertaken as soon as the element began to become clogged with solid particles, a considerably increased resistance to the flow of liquids through the filter was produced.

It is therefore an object of my invention to provide a filter which overcomes the above noted disadvantages by virtue of a substantially self-cleaning operation.

It is also an object of my invention to provide a filter of the character set forth in the preceding paragraph in which means is provided for preventing solid particles from plugging the minute pores of the filter element.

It is an additional object of my invention to provide a filter of the character set forth in the preceding paragraphs in which means is provided for continually dislodging solid particles from the filtering element to permit such particles to collect in a sump from which they may be readily removed.

It is a further object of my invention to provide a filter of the character set forth in the preceding paragraph in which means is employed for defining a liquid passage immediately adjacent the filter element of restricted cross sectional area, whereby the liquid being filtered is caused to flow over the surface of the filter element at an angle to the direction of flow of the liquid through the filter element and at such a high velocity as to thereby dislodge solid particles adhering to the surface of the filter element.

It is also an object of my invention to provide a filter of the character set forth in the preceding paragraphs in which means is provided for producing a gas on the surface of the filtering element to thereby prevent the solid particles from adhering to the filtering element.

It is a still further object of my invention to provide a filter for electrically conductive liquids which includes a chamber into which a filter element formed of an electrically conductive porous filtering material is extended in closely spaced relation to an electrically conductive shield and so arranged that liquid supplied to the chamber through the space between the filter element and the shield can escape only by passing through the porous filter element, and in which the shield and filter element are respectively connected to the positive and negative terminals of an external source of direct current.

Figure 2:
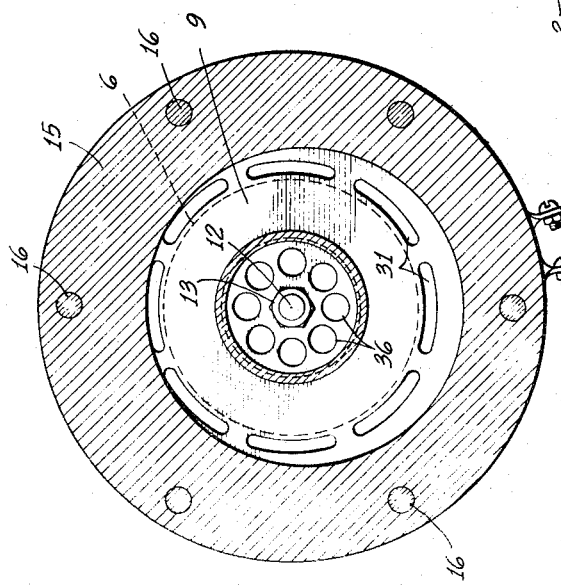

Other objects and advantages of my invention will be apparent from a study of the following specifications, read in connection with the accompanying drawing, wherein:

Fig. 1 is a longitudinal sectional view of the preferred embodiment of my invention; and Fig. 2 is a cross sectional view taken substantially along the line II—II of Fig. 1.

Referring to the drawing, I have illustrated in Fig. 1 the preferred embodiment of my invention as comprising a chamber 1 preferably of circular cross section having one end closed as indicated at 2 and the other end open, that portion near the open end being enlarged as indicated at 2a and surrounded by a radially extending flange 3. The chamber 1 encloses a tubular shield 4 which is preferably disposed in axial alignment with the chamber 1 and which has its innermost end open as indicated at 5. Within the tubular shield 4 there is a filter element 6 which is also of generally tubular form, but has its innermost end closed as indicated at 7.

The filter element 6 is formed of a porous filtering material, such as carbon, and has an outside diameter which is slightly smaller than the inside diameter of the shield 4 so as to define a relatively narrow annular space 8 through which a liquid to be filtered may be passed.

The filter element 6 may be secured to a supporting plate 9 as by providing an opening 10 in the inner end wall 7 of the element and an opening 11 through the center of the mounting plate 9 and by passing a supporting stud 12 through these apertures and employing nuts 13 for the purpose of clamping the filter element 6 securely to the supporting plate 9.

The filter construction of my invention also includes a head member 14 which includes a flanged portion 15 adapted to be secured to the flange portion 3 of the chamber 1 as by means of bolts or studs 16. These studs serve also to support the shield 4 and filter element 6 within the chamber 1 and for this reason there is interposed between the flange 15 and the supporting plate 9 a pair of disks or washers 17 and 18, the washer 17 preferably being formed of a suitable gasket or sealing material. When the filter is to be used for filtering electrically conductive liquids, the washer 18 is preferably formed of a suitable electrically insulating material, such as Bakelite or similar composition, the reason for such construction being explained in detail hereinafter.

The shield 4 is preferably formed to provide a radially extending flange 19 which is also clamped between the flange members 3 and 15, a pair of disks 20 and 21 (formed of insulating material if the filter is to be used with electrically conductive liquids) being disposed between the flange 19 and the supporting plate 9 and whatever spacing is desired between these two elements being provided by interposing between the washers 20 and 21 spacer disks 22. In a similar manner, the shield 4 may be also insulated from the chamber 1 as by means of an insulating washer 23 and a washer 24 which is formed of a suitable gasket or sealing material.

It will be understood that this entire assembly of flanges and washers is securely clamped between the head flange 15 and the chamber flange 3 by means of the bolts 16, these bolts being secured sufficiently tight to prevent fluid leakage between any of the mutually clamped surfaces. Furthermore, when used with electrically conductive liquids, the apertures which are provided in the shield flange 19 and the supporting plate 9 are preferably made considerably larger than the diameter of the bolts 16 so as to permit the use of insulating sleeves 25 for electrically insulating these members from the bolts 16.

The head member 14 is preferably provided with a pair of threaded bosses 26 and 27 bored to define inlet and outlet passages to permit attachment thereto of inlet and outlet pipes 28 and 29, respectively. The inlet pipe 28 communicates with an annular chamber 30 extending completely around the head member 14 so that liquid supplied thereto may be conducted to the aforementioned liquid passage 8 through suitable orifices or arcuate apertures 31 provided in each of the washers 17, 18, 21 and the supporting plate 9.

Fluid communication past the spacers 22 and washer 20 may be provided by forming these washers with an interior bore having a diameter sufficiently large to cause the inner edges 32 thereof to lie outside the openings 31. If desired, the washer 20 may be beveled as indicated at 33 to provide a smooth path of flow of the liquid from the inlet pipe 28 to the annular space 8 and to generally direct the liquid against the surface of the filter element 6. Liquid which is thus supplied to the interior of the chamber 1 is caused to pass through the porous filter element 6 to be received within the internal bore 34 thereof. This bore may communicate with the outlet pipe 29 as by providing in the head member 14 an outlet passage 35, communication between the bore 34 and the outlet passage 35 being afforded by means of suitable holes or apertures 36 provided in the supporting plate 9.

The outside diameter of the filter element 6 is so adjusted relative to the inside diameter of the shield 4 as to form the fluid passage 8 with a cross sectional area materially less than the cross sectional area of the inlet and outlet pipes 28 and 29 so that as the liquid is passed through the filter it will be caused to flow at high velocity along the annular passage 8. This high velocity of flow, occurring at an angle to the direction of flow of that portion of the fluid which passes through the filter element 6, will serve to dislodge any solid particles tending to adhere to the exterior surface of the filter element 6 and carry those particles into the interior of the chamber 1 adjacent the innermost end of the shield and filter element.

In case the liquid being filtered contains a considerable quantity of solid matter to be filtered out, this dislodging of the solid particles from the surface of the filter element 6 is further enhanced by the scouring action of the solid particles carried in suspension in the liquid as it rushes along the annular passage 8. When the liquid reaches the end of this passage 8, the velocity of flow is abruptly decreased, with the result that the solid particles thus swept into the end of the chamber are allowed to settle out, whereby they collect at the bottom of the chamber 1.

Provision for removing such deposit of solid material may include a blow-off connection 37 equipped with a shut-off valve 38. Opening of the valve 38 will permit liquid entering the chamber 1 from the supply pipe 28 to flow through the blow-off 37 to carry with it the solid material which is gathered in the lower portion of the chamber.

In order to maintain the above described filter in substantially continuous operation, it is necessary that the deposit of solid material collecting at the bottom of the chamber 1 be periodically removed. This removal may be accomplished by means of a manual blow-off valve 38, such as that above described, or, if desired, the valve 38 may be arranged to be operated automatically either by the use of a timing mechanism arranged to open the valve 38 for a short length of time at predetermined time intervals, or the valve may be operated in accordance with the amount of liquid which is filtered by the filter as by providing a metering device for measuring the quantity of liquid which is passed through the filter and then arranging this metering device to open the valve 38 for a short period upon the flow of a predetermined amount of liquid through the filter.

In case the filter construction above described is to be used for the filtering of electrically conductive liquids, such as for example, aqueous solutions of acids, bases or metallic salts or aqueous solutions thereof, the self-cleaning action of the filter may be further enhanced by producing an electrolytic action within the filter. In such a case the shield 4 and filter element 6 are each formed of an electrically conductive material, the filter element 6, of course, being provided with the necessary porosity to provide the desired filtering action, carbon having been found to be a particularly suitable electrically conductive porous material for use as a filtering element.

The electrolytic action may be produced by providing a source of direct current such as a battery 39 which may be connected as by means of wires 40 to terminal lugs 41 and 42 formed respectively on the filter element supporting plate 9 and the flange portion 19 of the shield 4 so as to cause the filtering element 6 and the shield 4 to constitute the electrodes of an electrolytic cell.

The potential of the battery 39 is so adjusted as to cause a gas resulting from the electrolytic decomposition of the electrically conductive liquid to collect as bubbles on the surface of the filtering element 6. In the case of aqueous solutions, the negative battery terminal is preferably connected to the filter element 6 so that the passage of current from the shield 4 through the electrically conductive liquid to the filter element 6 will cause the evolution of hydrogen gas at the filter element 6 which collects on the surface thereof in the form of minute bubbles. These bubbles are in a constant state of mobility and serve to prevent the adherence of solid particles to the surface of the filtering element 6, with the result that the high velocity flow of liquid through the relatively narrow annular space 8 dislodges and carries these solid particles to the innermost end of the chamber 1. The connection of the negative battery terminal to the filter element 6 is preferred in case the filter is used with aqueous solutions for the reason that as a result of the electrolytic decomposition of the solution, the volume of hydrogen gas produced is twice the volume of the oxygen produced, thus requiring a correspondingly smaller amount of current to be passed through the filter in order to achieve the desired self-cleaning action.

The potential which is applied across the electrodes is preferably maintained at a sufficiently low value to cause but a slight decomposition of the liquid so that there is not produced within the filter an excessive amount of gas, voltages less than six volts being ordinarily sufficient to produce this result.

Such of the gas produced which may be washed into the inner end of the chamber 1 may collect in the upper portion of the chamber and the enlargement 2a is provided for accommodating such a collection of gas. In the case of aqueous solutions, it may be desired to reduce to a minimum the oxidation of the shield 4 as a result of the nascent oxygen which is evolved at the positive electrode. This may be accomplished by employing an inherently oxidation-resistant material such as the metals of the platinum group.

Furthermore, when the filter of my invention is to be employed for the filtering of electrolytes, the above described production of gas on the surface of the filtering element may be accomplished without requiring an external source of direct current as by forming the filter element 6 of carbon and the shield 4 of a material which is electronegative relative to the filter element 6, such as zinc, the terminals 41 and 42 being merely shorted together so that the galvanic action produced by the electrolyte between the electrodes will cause a current to flow from the shield to the filtering element with the resultant production of gas on the surface of the filtering element.

I have found that the electrolytic action above described prevents the plugging of the filtering element so that the filter may be continuously operated over extremely long periods of time without requiring a renewal of the filtering element nor any cleaning other than the periodic opening of the valve 38 for the purpose of washing the filtered out solid materials from the chamber 1.

While I have shown and described the preferred embodiment of my invention, I do not desire to be limited to any of the details of construction shown or described herein, except as defined in the appended claims.

I claim:

1. In a filter, the combination of: a member defining a chamber having an inlet passage and an outlet passage through which liquids may pass into and out of the chamber; a tubular filter element formed of a porous electrically conductive material disposed in said chamber in such position that liquids entering through said inlet passage must pass through said filter element to reach the outlet passage; an electrically conductive tubular shield surrounding said filter element and so disposed in said chamber that all liquid passing through said chamber must pass between said shield and said filter element, said shield having such an internal diameter as related to the external diameter of said filter element as to define an annular passage for liquid having a cross sectional area materially less than the cross sectional area of either said inlet or said outlet passages; and means electrically insulating said filter element and said shield from each other, the porous filter element being cathodic, whereby a coating of gas bubbles is formed on the outside of said filter element to prevent adherence of solid particles to the surface thereof and the passage of the liquid along said annular space of restricted area at an increased velocity will cause any particles accumulating on said external surface of said filter element to be washed therefrom.

2. In a filter, the combination of: a member defining a chamber having an inlet passage and an outlet passage through which liquids may pass into and out of the chamber; a tubular filter element formed of porous carbon disposed in said chamber in such position that liquids entering through said inlet passage must pass through said filter element to reach the outlet passage; an electrically conductive tubular shield disposed adjacent to and substantially concentric with said filter element and so disposed in said chamber that all liquid passing through said chamber must pass between said shield and said filter element, said shield having such a diameter as related to the diameter of said filter element as to define an annular passage for liquid having a cross sectional area materially less than the cross sectional area of either said inlet or said outlet passages; means electrically insulating said filter element and said shield from each other; and means connecting said shield and filter element across a source of direct current, the porous filter element being cathodic, whereby a coating of gas bubbles is formed on the surface of said filter element adjacent said shield to prevent adherence of solid particles to said surface and the passage of the liquid along said annular space of restricted area at an increased velocity will cause any particles accumulating on said surface of said filter element to be washed therefrom.

3. In a filter, the combination of: a member defining a chamber having an inlet passage and an outlet passage through which liquids may pass into and out of the chamber; a tubular filter element closed at one of its ends and formed of a porous electrically conductive material disposed in said chamber in such position that liquids entering through said inlet passage must pass through said filter element to reach the outlet passage; an electrically conductive tubular shield disposed adjacent to and substantially concentric with said filter element and so disposed in said chamber that all liquid passing through said chamber must pass between said shield and said filter element, said shield having such a diameter as related to the diameter of said filter element as to define an annular passage for liquid having a cross sectional area materially less than the cross sectional area of either said inlet or said outlet passages; means electrically insulating said filter element and said shield from each other; and means connecting said shield and filter element across a source of direct current, the porous filter element being cathodic, whereby a coating of gas bubbles is formed on the surface of said filter element adjacent said shield to prevent adherence of solid particles to said surface and the passage of the liquid along said annular space of restricted area at an increased velocity will cause any particles accumulating on said surface of said filter element to be washed therefrom.

JOSEPH T. ROFFY.